United States Patent [19]

Ito

[11] Patent Number: 4,829,460
[45] Date of Patent: May 9, 1989

[54] BARREL SHIFTER

[75] Inventor: Akira Ito, Kawasaki, Japan

[73] Assignee: Fujitsu Limited, Kawasaki, Japan

[21] Appl. No.: 108,214

[22] Filed: Oct. 14, 1987

[30] Foreign Application Priority Data

Oct. 15, 1986 [JP] Japan .................................. 61-243055

[51] Int. Cl.⁴ ......................... G06F 7/00; G06F 15/00; G11C 19/00
[52] U.S. Cl. .................................. 364/715.08; 377/69
[58] Field of Search ..................... 364/715; 377/64, 69, 377/70, 73, 75

[56] References Cited

U.S. PATENT DOCUMENTS 4,396,994  8/1983  Kang et al .......................... 364/900
4,665,538  5/1987  Machida ................................ 377/69

FOREIGN PATENT DOCUMENTS 59-161731  9/1984  Japan .
59-218578  12/1984  Japan .
60-93549   5/1985   Japan .
60-167030  8/1985   Japan .
60-233729  11/1985  Japan .
61-175819  8/1986   Japan .

OTHER PUBLICATIONS

Weinberger, A., "Arithmetic Shift", *IBM Technical Disclosure Bulletin*, vol. 19, No. 1, pp. 207–216, Jun. 1976.
"Barrel Shifter Rotator", *IBM Technical Disclosure Bulletin*, vol. 29, No. 9, Feb. 1987.

*Primary Examiner*—Gary V. Harkcom
*Assistant Examiner*—Dale M. Shaw
*Attorney, Agent, or Firm*—Staas & Halsey

[57] ABSTRACT

A barrel shifter including a first bit reverse unit which reverses the bit position of all bits of input data or passes the bit positions to leave them as they are; a bit shift unit which shifts output bits from the first bit reverse unit in one fixed direction by exactly the number of bits to be shifted; and a second bit reverse unit which reverses the bit position of all bits of input data or passes the bit positions to leave them as they are, to produce the desired output data. Thus, even if there is an increase of the number of bits of the input data, the hardware structure and control do not become complicated and the use of integrated circuits (ICs) is made easy.

13 Claims, 10 Drawing Sheets

ARITHMETIC 3 BIT RIGHT SHIFT

Fig. 8

LOGIC 3 BIT RIGHT SHIFT

Fig. 9
LOGIC 3 BIT LEFT SHIFT

Fig. 10

BARREL SHIFTER

BACKGROUND OF THE INVENTION

1. Field of the Invention

The present invention relates to a barrel shifter which can be easily realized in the form of an integrated circuit.

In arithmetic operations and logic operations, use is made of a barrel shifter to shift a desired number of bits in a desired direction in a machine cycle. An arithmetic operation shift is used, for example, in a digital signal processor (DSP) and, for example, will perform a right-direction shift of one bit, two bits, three bits, etc. of a bit train to achieve at one time a division operation of $\frac{1}{2}$, $\frac{1}{4}$, $\frac{1}{8}$, and so on. Conversely, it will perform a left-direction shift of one bit, two bits, three bits, etc. to achieve at one time a multiplication operation of X2, X4, X8, etc. In this case, the barrel shifter is mounted near the arithmetic and logic unit (ALU) in the DSP and cooperates with the ALU.

On the other hand, the logic operation shift is used for processing data in a central processing unit (CPU). For example, when 16-bit data is received and the requisite 4-bit portion thereof is at the lower bit side, if it is desired to move this 4-bit portion to the upper bit side for loading in the CPU memory, this shift is used to shift the 4-bit portion at one time.

The hardware structure of this barrel shifter becomes larger in accordance with the increase of the operation accuracy, and thus use of an integrated circuit for the same is difficult. Therefore, there is a demand for a structure which can be realized on a relatively small circuit scale, even when there are a large number of data bits, and which facilitates use of an integrated circuit.

2. Description of the Related Art

Shift registers are in general use as circuits for shifting data, but only enable 1-bit shifts with each clock. Therefore, when shifting a plurality of bits, a plurality of clocks are required. Therefore, a problem arises in that the shift operation takes a long time when a large number of bits must be shifted. Accordingly, a barrel shifter is used for shifting a plurality of bits in one machine cycle.

Two types of conventional barrel shifter are known, both described later. In the first type, an increase in the number of bits of data drastically enlarges the circuit size of the barrel shifter and makes the use of an integrated circuit difficult.

In the second type, an increase in the number of bits of data complicates the shift control.

SUMMARY OF THE INVENTION

The object of the present invention is to provide a barrel shifter which enables a shift of a desired number of bits with a relatively simple structure even when there are a large number of bits of data and which facilitates the use of an integrated circuit.

To achieve the above-mentioned object, the present invention provides a barrel shifter for shifting a desired number of bits in a single machine cycle, which uses 2-1 selectors comprised of transfer gates to constitute bit reverse units which decide whether or not to reverse the position of all bits and a bit shift unit including a plurality of shift stages, which barrel shifter facilitates the use of an integrated circuit through a simple structure and which realizes a simple shift control.

BRIEF DESCRIPTION OF THE DRAWINGS

The above-mentioned object and features of the present invention will become clearer from the following explanation made in reference to the appended drawings, wherein.

DESCRIPTION OF THE PREFERRED EMBODIMENTS

To facilitate understanding of the present invention, before explaining the constitution of the present invention, a description will be given of the conventional first and second type barrel shifters.

Figure 1:
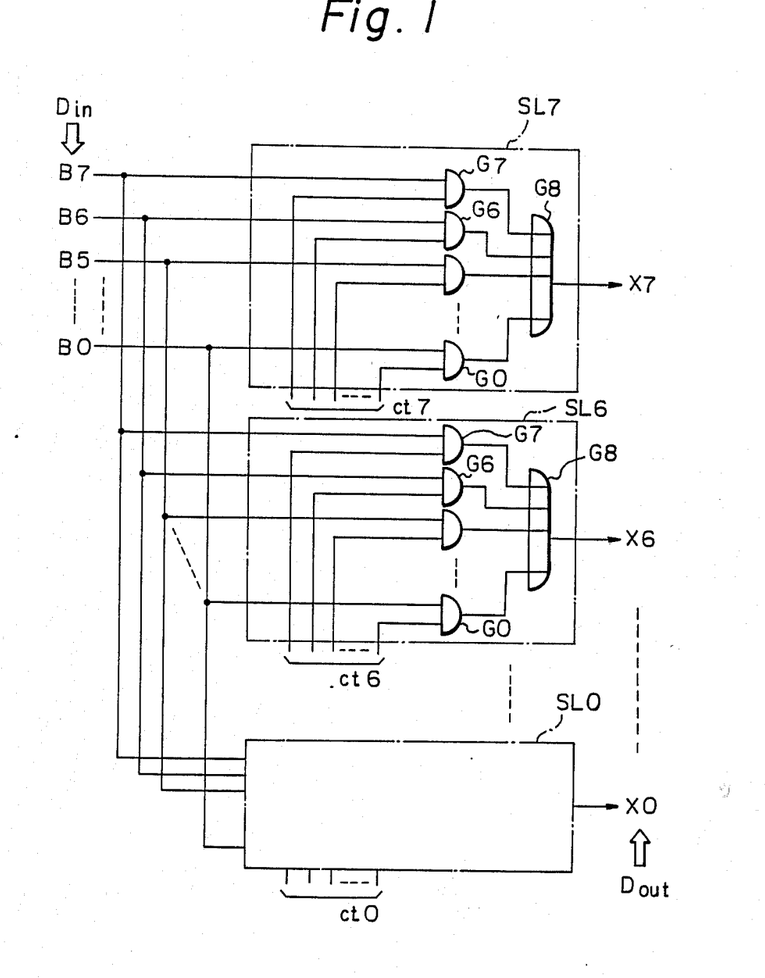
FIG. 1 shows a barrel shifter of the conventional first type.
Figure 2:
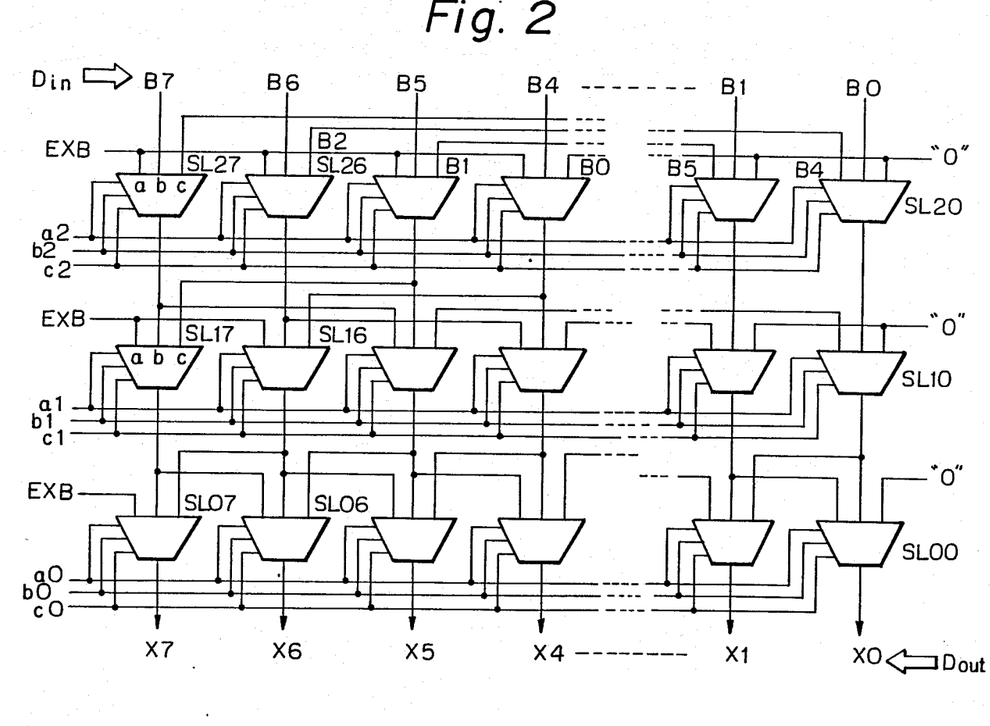
FIG. 2 shows a barrel shifter of the conventional second type.

FIG. 1 shows a barrel shifter of the conventional first type and FIG. 2 a barrel shifter of the conventional second type.

FIG. 1 shows an example of the case where there are eight bits B0 to B7 of input data $D_{in}$, provision is made of an 8-1 shifter for selecting and outputting one bit out of the eight, and output date $D_{out}$ shifted by the desired number of bits is output. Corresponding to the bits B0 to B7, provision is made of 8-1 selectors SL0 to SL7 including AND gates G0 to G7 and an OR gate G8. The eight bits B0 to B7 are input respectively to the 8-1 selectors SL0 to SL7. In accordance with the control signals ct0 to ct7, one bit is selected and output to given output data $D_{out}$ including bits X0 to X7 shifted by the desired number of bits.

FIG. 2 shows an example of the case where there are eight bits B0 to B7 of input data $D_{in}$, provision is made of three stages of 3-1 selectors for selecting and outputting one bit out of three, and output data $D_{out}$ including bits X0 to X7 shifted by the desired number of bits is output. SL00 to SL07, SL10 to SL17, and SL-20 to SL27 are 3-1 selectors, a0, b0, c0 to a2, b2, c2 are control signals, and EXB is a sign bit or an external bit of "0".

In the first stage, consisting of the 3-1 selectors SL20 to SL27, a 4 (=8/2) shift is achieved, when, for example, the 3-1 selector SL27 receives the external bits EXB, B7, and B3 as input, the 3-1 selector SL26 receives the bits EXB, B6, and B2 as input, the 3-1 selector SL20 receives the bits B4, B0, and "0" as input, and either of the terminals a and c is selected.

In the second stage, consisting of the 3-1 selectors SL10 to SL17, a 2 (=8/4) shift is achieved, when the 3-1 selector SL17 receives the external bits EXB, B7 (or B3), and B5 (or B1) as input, the 3-1 selector SL16 receives the bits EXB, B6 (or B2), and B4 (or B0) as input, the 3-1 selector SL10 receives the bits B2 (or B6), B0 (or B4), and "0" as input, and either of the terminals a and c is selected.

In the end stage, consisting of the 3-1 selectors SL00 to SL07, a 1 (=8/8) bit shift is achieved when the 3-1 selector SL07 receives the external bits EXB, B7 (or B3, B5, B1), and B6 (or B2, B4, and B0) as input, the 3-1 selector SL06 receives the bits B7 (or B3, B5, B1), B6 (or B2, B4, B0), and B5 (or Bl, B3, B7) as input, in the same way as above. Therefore, when making a 7-bit, left-direction shift, the input bit B0 is shifted to the output bit X7 position and the output bits X6 to X0 all become "0".

The control signals a0, a1, and a2 indicate a right direction shift, b0, b1, and b2 passing without a shift, and c0, c1, and c2 a left-direction shift. The shift of 0 to 7 bits is controlled by a 3-bit control signal.

The first type of barrel shifter shown in FIG. 1 requires n number of n−1 selectors for selecting and outputting one bit from n bits, where n is the number of bits. Further, an n−1 selector is comprised of n number of AND gates. Therefore, the circuit becomes relatively large in size, with the limit being about n=8. Consequently, when the number of bits of data is further increased so as to improve the operation accuracy, as mentioned before, the circuit size drastically increases and it becomes difficult to use an integrated circuit.

The second type of barrel shifter shown in FIG. 2 is provided with $\log_2 n$ number of stages comprised of 3-1 selectors, wherein n is the number of bits. In the case of 8 bits, therefore, there are has three stages, as shown in the figure. At the first stage, n/2 bit shifts are performed, at the next stage, n/4 bit shifts are performed, and at the end stage, n/n bit shifts are performed. Compared with n−1 selectors, 3-1 selectors have a simpler construction, but nevertheless, when the number of bits n increases, as mentioned above, control over the same becomes complicated.

Figure 3:
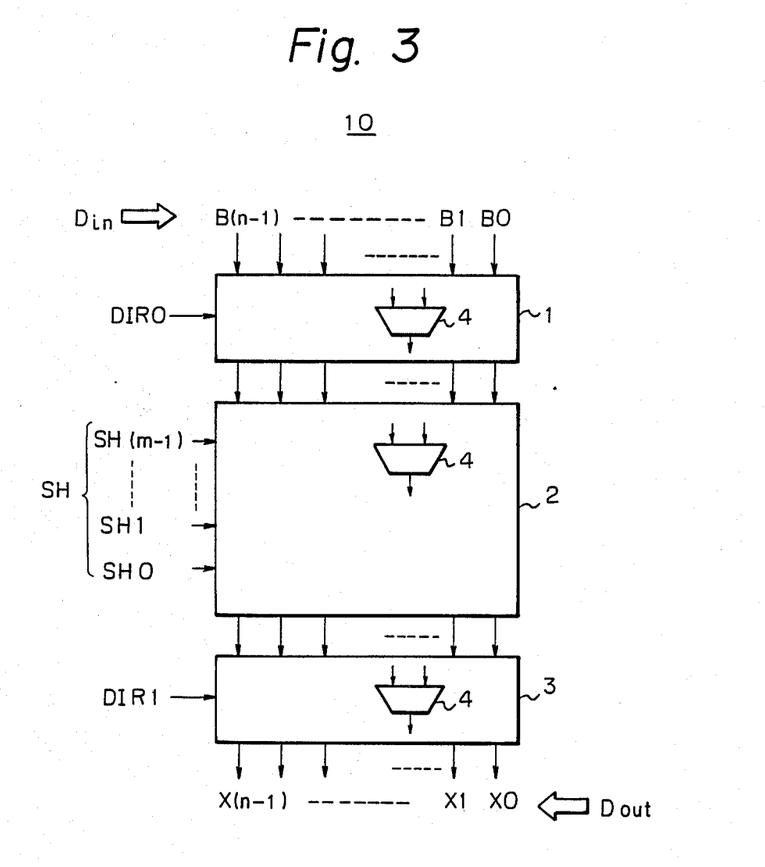
FIG. 3 shows the principle construction of a barrel shifter according to the present invention.

Next, the barrel shifter of the present invention will be explained. FIG. 3 is a block diagram showing the principle construction of the present invention. The barrel shifter 10 is fabricated using simple 2-1 selectors. The barrel shifter is provided with a first bit reverse unit 1 which decides whether or not to reverse the position of n bits of the input data $D_{in}$, that is, B0 to B(n−1), by a first shift direction control signal DIR0, a bit shift unit 2 which decides whether or not to shift the output bits by n/2 to n/n corresponding to the shift stages, by shift amount control signal bits SH0 to SH(m−1), and a second bit reverse unit 3 which decides whether or not to reverse the position of the output bits of the bit shift unit 2 by the second shift direction control signal DIR1. The first and second bit reverse units 1 and 3 and the shift stages of the bit shift unit 2 are comprised of a number of 2-1 selectors 4 corresponding to the number of bits of the input data $D_{in}$, respectively. The operation of the barrel shifter 10 is as follows:

The first and second bit reverse units 1 and 3 reverse the bit positions of all the bits of the input data $D_{in}$, so the most significant bit (MSB) is changed to the least significant bit (LSB), the second bit from the MSB is changed to the second bit from the LSB, the third bit from the MSB is changed to the third bit from the LSB, and so forth, with all the bit positions being reversed. Control is effected to reverse or leave the bit positions as they are by the control signals DIR0 to DIR1.

The bit shift unit 2 is comprised of m number of shift stages, wherein $m = \log_2 n$ and n is the number of bits of the input data $D_{in}$. This bit shift unit 2 decides whether or not to perform a shift at the shift stages by the shift amount control signal. The bit shift unit 2 is constructed to perform shifts in only one direction, therefore, for example, when constructed to perform shifts in only the right direction, and when the desired operation is a right shift by a predetermined number of bits the first and second bit reverse units 1 and 3 do not reverse the bit position and the operation is performed as if only the shift unit 2 exists, resulting in output bits X0 to X(n−1) shifted by the predetermined number of bits in the right direction.

More specifically, a 2-bit left-direction shift of input data $D_{in}$ is the exact equivalent of reversing the bit positions of all the bits of the input data $D_{in}$, then performing a 2-bit right-direction shift and reversing all bits again. A left-direction shift also can be realized in this way, with only a one-directional (right direction) shift.

When performing a 2-bit left-direction shift on input data of
$D_{in} = 10110101$,
$\overline{D}_{in}$ is reversed to give
$\overline{D}_{in} = 10101101$
then this is shifted by 2 bits to give
$\overline{D}_{in2} = 00101011$
and this is again reversed to give
$D_{in2} = 11010100$
This is exactly the same value as would have been obtained by performing a 2-bit shift of the initial input data $D_{in}$ in the left direction.

When shifting a predetermined number of bits in the left direction, the first and second bit reverse units 1 and 3 reverse the bit positions. That is, they reverse the positions of the bits B0 to B(n−1) of the input data Din to give the sequence B(n−1) to B0, which is shifted in the right direction at the shift unit 2, and the bit positions again reversed, resulting in output bits X0 to X(n−1) shifted by a predetermined number of bits in the left direction.

Figure 4:
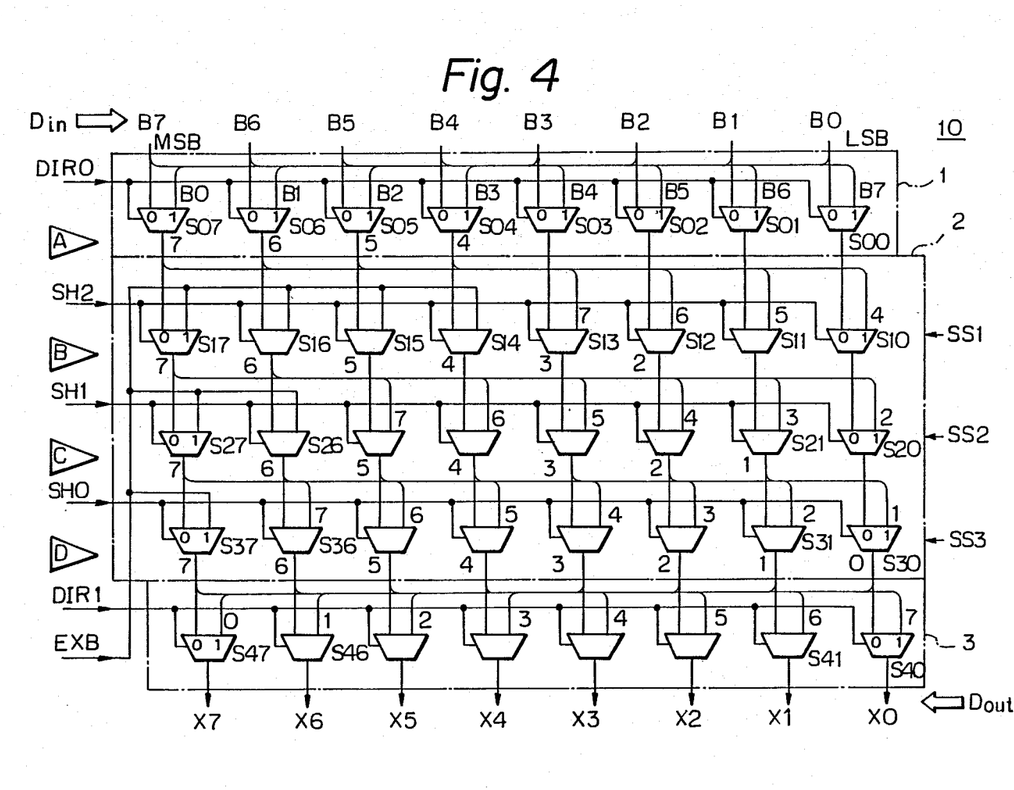
FIG. 4 shows an embodiment of a barrel shifter according to the present invention.

FIG. 4 shows an embodiment of a barrel shifter according to the present invention, in particular the case of eight bits of input data $D_{in}$. In the figure, 1 and 3 are first and second bit reverse units, 2 a bit shift unit, S00 to S07, S10 to S17, S20 to S27, S30 to S37, and S40 to S47 2-1 selectors for selecting and outputting one bit out of the two bit inputs, DIR0 and DIR1 shift direction control signals for deciding whether or not to reverse the bit positions at the bit reverse units 1 and 3, SH0, SH1, and SH2 shift amount control signals corresponding to each shift stage, and EXB a sign bit or "0" external bit.

The 2-1 selectors may be comprised of, for example, transfer gates, and select and output one bit, corresponding to "1" or "0" of the control signals, from the two input bits. Since these selections have a simple construction and select only one of two bits, the control is simplified.

In the first bit reverse unit 1, the least significant bit (LSB) and the most significant bit (MSB) are input to the 2-1 selector S00 and the second bit B1 from the LSB and the second bit from the MSB are input to the 2-1 selector S01. The same applies to the other 2-1 selectors, with bits being input for reversal of the bit positions. When the shift direction control signal DIR0 is "0", the input of the terminal 0 is selected and output, and a bit reversal is not performed. When "1", the input of the terminal 1 is selected and output, and a bit reversal is performed.

In the bit shift unit 2, which receives the output bits of the first bit reverse unit 1 as input, the first shift stage SS1 is comprised of the 2-1 selectors S10 to S17. This shift stage SS1 performs an n/2 bit shift, that is, a 4-bit shift. For example, the 2-1 selector S10 receives the output bits of the 2-1 selectors S00 and S04 of the bit reverse unit 1 as input, the 2-1 selector S13 receives the output bits of the 2-1 selectors S03 and S07 of the bit reverse unit 1 as input, and the 2-1 selector S17 receives an external bit EXB and the output bits of the 2-1 selector S07 of the bit reverse unit 1 as input. That is, the output bits 4 to 7 of the 2-1 selectors S04 to S07 of the bit reverse unit 1 become the input bits 4 to 7 of the 2-1 selectors S10 to S13 of the first shift stage SS1.

In this first shift stage SS1, when the bit SH2 of the shift amount control signal is "1", external bits EXB are output from the 2-1 selectors S14 to S17, and output bits of the 2-1 selectors S04 to S07 of the bit reverse unit 1 are output from the 2-1 selectors S10 to S13. Therefore, a 4-bit shift is achieved, four bits worth of external bits EXB are added to the head, and an output is obtained.

The next shift stage SS2 is comprised of the 2-1 selectors S20 to S27. This shift stage SS2 performs an n/4 bit shift, that is, a 2-bit shift. The upper bit side 2-1 selectors S26 and S27 receive the output bits of the 2-1 selectors S16 and S17 and the external bit EXB as input, and the 2-1 selectors S20 to S25 receive the output bits of the 2-1 selectors S10 and S15 and the output bits 2 to 7 of the 2-1 selectors S12 to S17 shifted by two bits as input.

When the bit SH1 of the shift amount control signal is "1", external bits EXB are output from the 2-1 selectors S26 and S27 and the output bits 2 to 7 of the 2-1 selectors S12 to S17 are output from the 2-1 selectors S20 to S25.

The end shift stage SS3 is comprised of the 2-1 selectors S30 to S37. This shift stage SS3 performs an n/n bit shift, that is, a 1-bit shift. The upper bit side 2-1 selector S37 receives the external bit EXB and the output bit 7 of the 2-1 selector S27, and the other 2-1 selectors S30 to S36 receive the output bits of the 2-1 selectors S20 to S26 and the output bits 1 to 7 of the 2-1 selectors S21 to S27 shifted by one bit as input.

When the bit SH0 of the shift amount control signal is "1", external bits EXB are output from the 2-1 selector S37 and the output bits 1 to 7 of the 2-1 selectors S21 to S27 are output from the 2-1 selectors S30 to S36.

When the bits SH0, SH1, and SH2 of the shift amount control signal are all "1", a 7(="111")-bit shift is performed. When the bit position is not reversed at the bit reverse unit 1 (during right-direction shift), the input bit B7 is output to the least significant bit position via the 2-1 selectors S13, S21, and S30, whereby the external bit EXB is output to the upper bit position. When the bits SH0 and SH1 of the shift amount control signal are "1" and SH2 is "0", a 3(="022")-bit shift is performed. When the bit position is not reversed at the bit reverse unit 1 (right-direction shift), bit B7 of the input data $D_{in}$ is output via the 2-1 selectors S17, S25, and S34, the bit B3 of the input data $D_{in}$ is output via the 2-1 selectors S13, S21, and S30 to the least significant bit position, and the external bit EXB is output from the 2-1 selectors S35 to S37.

The second bit reverse unit 3 is comprised of the 2-1 selectors S40 to S47. In the same way as the first bit reverse unit 1, a decision is made whether or not to reverse the bit position by the shift direction control signal DIR1. That is, when the control signal DIR1 is "0" (right-direction shift), the terminal 0 of the 2-1 selectors S40 to S47 is selected, so the bit position is not reversed. In the case of "1" (left direction shift), the terminal 1 is selected, so the output bit 7 of the 2-1 selector S37 is output as the least significant bit X0 from the 2-1 selector S40, and the output bit 0 of the 2-1 selector S30 is output as the most significant bit X7 from the 2-1 selector S47.

The 2-1 selectors of the first and second bit reverse units 1 and 3 and the shift stages (SS) of the shift unit 2 are simply constructed, as mentioned above, and thus can be easily operated at a high speed. Therefore, even when many shift stages are connected in tandem, it is possible to shift a desired number of bits in one machine cycle. Further, by controlling the bit reverse units 1 and 3, it is possible to shift in any direction for output.

When the input data $D_{in}$ is comprised of 16 bits, the bit reverse units 1 and 3 and the shift stages (SS) of the shift unit 2 should be respectively comprised of 16 2-1 selectors and four shift stages made ($\log_2 16 = 4$). Further, in the case of a 32 bit construction, the bit reverse units 1 and 3 and the shift stages of the shift unit 2 should be respectively comprised of 32 2-1 selectors and five shift stages made ($\log_2 32 = 5$).

Figure 5:
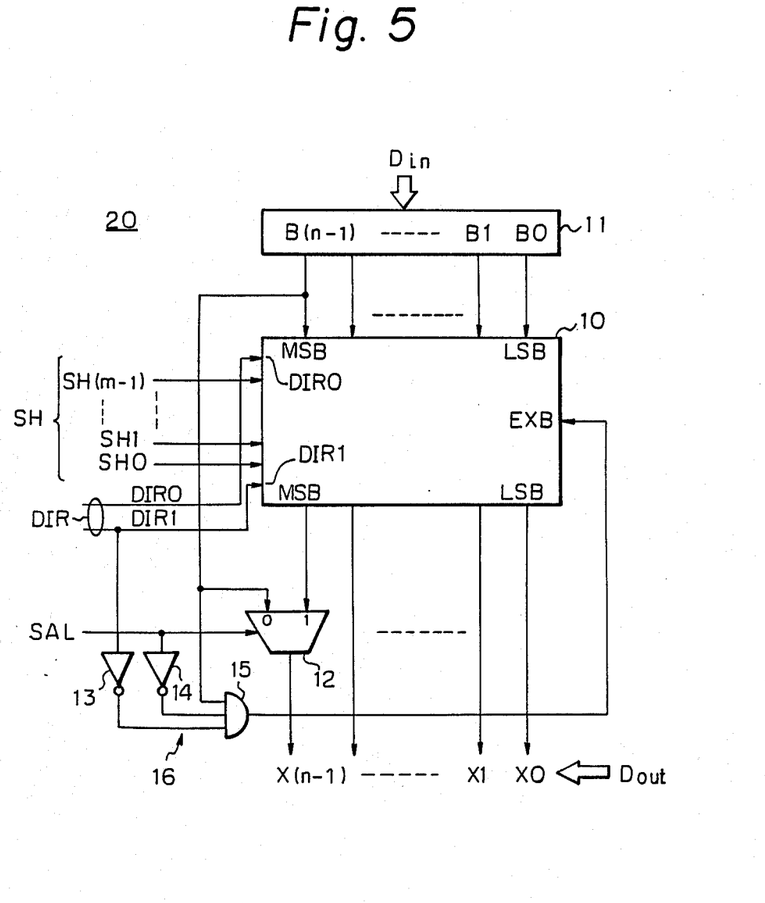
FIG. 5 shows a barrel shifter unit with integral barrel shifter peripheral elements.

FIG. 5 shows a barrel shifter unit 20 with an integral barrel shifter and peripheral elements, wherein 10 is the barrel shifter explained in FIGS. 3 and 4, outside of which are the peripheral elements, 11 is an input register, 12 an arithmetic/logic 2-1 selector, 13 and 14 inverters, and 15 an AND circuit, elements 13, 14, and 15 comprising a logic circuit 16. DIR are shift direction control signals (DIR0 and DIR1) which determine the shift direction, for example, a right direction shift is indicated by "0" and a left-direction shift by Further, SAL is an arithmetic/logic specifying "1". Further, SAL is an arithmetic/logic specifying signal which determines whether to perform an arithmetic operation shift or logic operation shift, being "0" for an arithmetic operation shift and "1" for a logic operation shift. SH0 to SH(m−1) are the bits of a shift amount control signal.

When the input register has stored therein input data $D_{in}$ of n bits B0 to B(n−1) and an arithmetic 3-bit right-direction shift is to be performed, the shift amount control signal DIR (DIR0=DIR1) becomes "0", the arithmetic/logic specifying signal SAL becomes "0", the shift amount control signal bits SH0 and SH1 become "1", and the other shift amount control signal bits SH2 to SH(m−1) become "0". The control signal DIR becomes the control signals DIR0 and DIR1 of the barrel shifter 10 (see FIG. 4), which is "0", and thus a bit reversal is not performed. Further, the outputs of the inverters 13 and 14 both become "1", so the most significant bit B(n−1) is applied to the barrel shifter 10 as the external bit EXB via the AND gate 15. The most significant bit B(n−1) is a sign bit, and thus is output as the most significant bit X(n−1) via the selector 12.

Therefore, the n bits of input data $D_{in}$, i.e., the bits B0 to B(n−1), from the input register 11 are output shifted by three bits in the right direction at the barrel shifter 10. The sign bit is added at the head portion and the bits shifted in the right direction are added.

In the case of a 5-bit left-direction arithmetic operation shift, the shift direction control signal DIR (DIR0=DIR1) becomes "1", the arithmetic/logic specifying signal SAL becomes "0", the shift amount control signal bits SH0 and SH2 become "1", and the other shift amount control signal bits SH1 and SH3 to SH(m−1) become "0". Therefore, the positions of the n bits B0 to B (n−1) from the input register 11 are reversed, a 5-bit right-direction shift is performed, and the bit positions are again reversed. Since the output of the inverter 13 is "0", this "0" is added to the five bits shifted in the right direction and the bit positions are reversed, whereby "0" is added to the output at the lower bit side. The sign bit of the most significant bit B(n−1) of the register 11 is output via the selector 12.

In the case of a 2-bit right-direction logic operation shift, the shift direction control signal DIR (DIR0=DIR1) becomes "0", the arithmetic/logic specifying signal SAL becomes "1", the shift amount control signal bit SH2 becomes "1", and the other shift amount control signal bits SH0 and SH2 to SH(m−1) become "0". Therefore, the positions of the n bits B0 to B(n−1) from the input register 11 are not reversed, a 2-bit right-direction shift is performed, and the result output. From the selector 12, the most significant bit MSB of the barrel shifter is selected and output to become the most significant bit X(n−1). The external bit EXB becomes "0".

Therefore, in the case of the right-direction arithmetic operation shift, the sign bit, i.e., the MSB, is extended. In the case of other shifts, "0" is extended. By making the logic of the first shift direction control signal DIR0 and the logic of the second shift direction control signal DIR1, bit reverse processing becomes possible. For example, $D_{in}$=111000 can be reversed to $\overline{D}_{in}$=000111, and this can, for example, be utilized for the memory access of a fast Fourier transformer (FFT).

Figure 6:
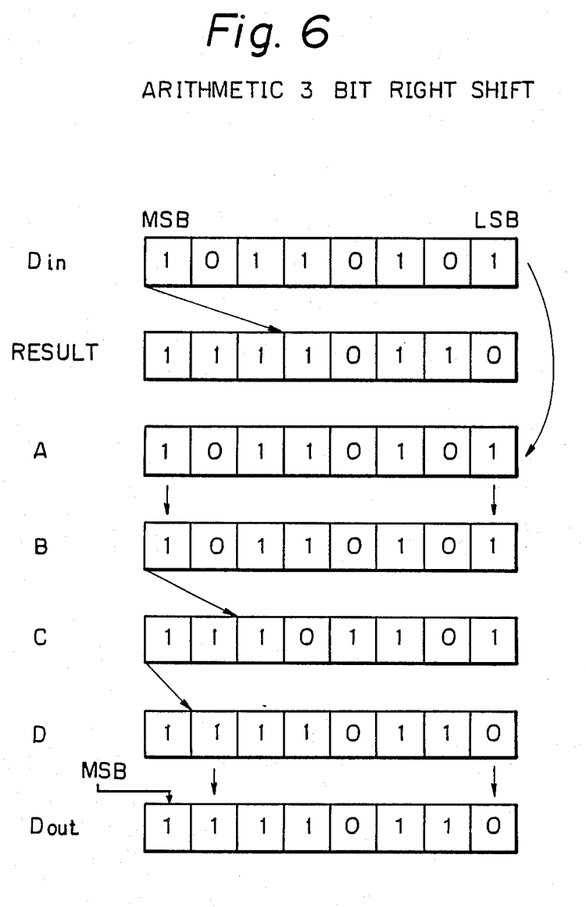
FIG. 6 is a chart for facilitating understanding of the flow of the bit pattern in a 3-bit right-direction shift in an arithmetic operation.
Figure 7:
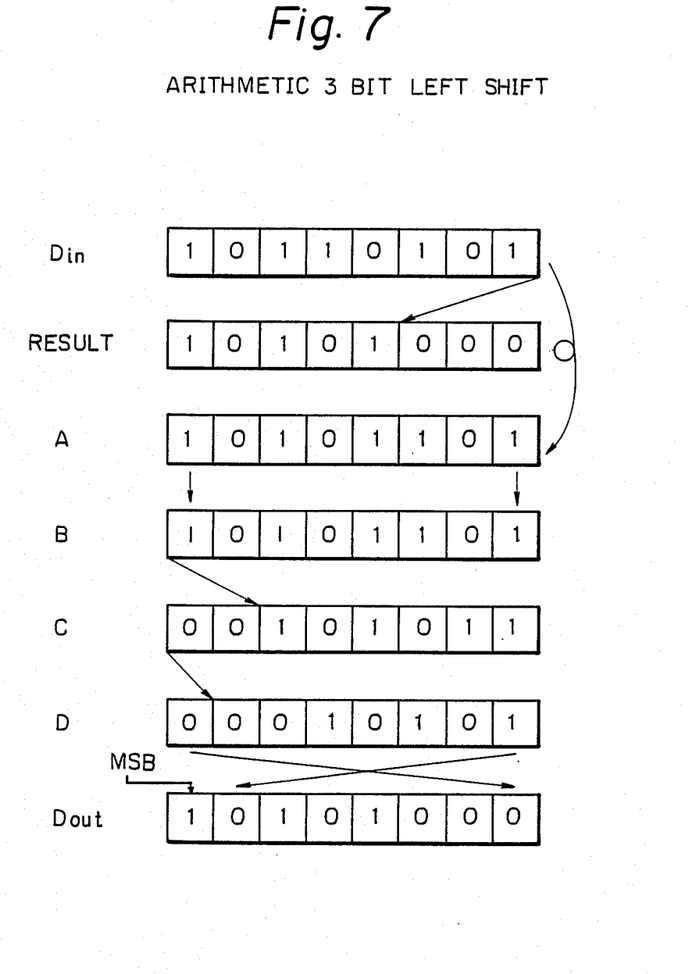
FIG. 7 is a chart for facilitating understanding of the flow of the bit pattern in a 3-bit left-direction shift in an arithmetic operation.
Figure 8:
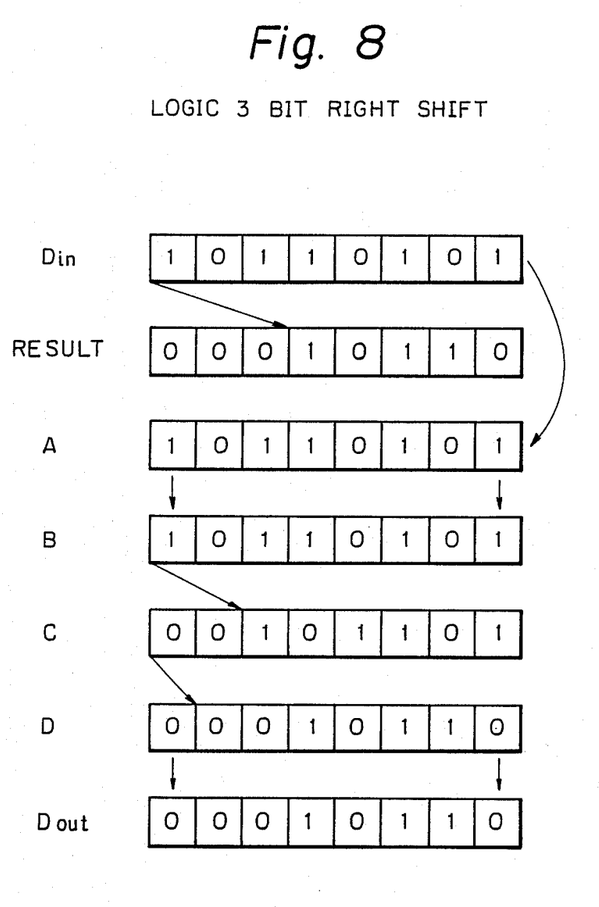
FIG. 8 is a chart for facilitating understanding of the flow of the bit pattern in a 3-bit right-direction shift in a logic operation.
Figure 9:
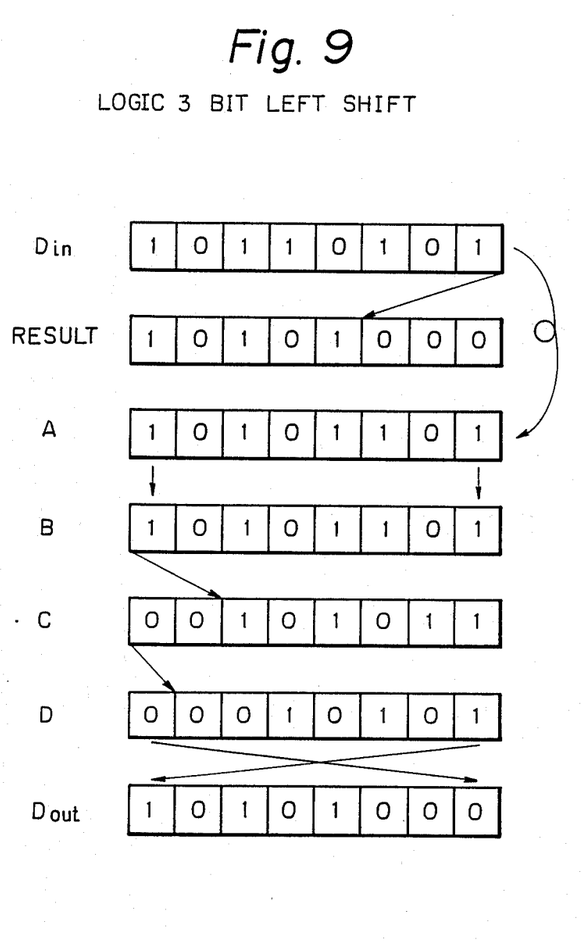
FIG. 9 is a chart for facilitating understanding of the flow of the bit pattern in a 3-bit left-direction shift in a logic operation.

Referring to FIG. 6 to FIG. 9, an explanation will be given of the specific flows of bit patterns, to further clarify the operation of the barrel shifter according to the present invention. FIG. 6 is a chart for facilitating understanding of the flow of the bit pattern in a 3-bit right-direction shift in an arithmetic operation; FIG. 7 a 3-bit left-direction shift in an arithmetic operation; FIG. 8 a 3-bit- right-direction shift in a logic operation; and FIG. 9 a 3-bit left-direction shift in a logic operation.

Note that the input data $D_{in}$ used in these four examples are all identical bit patterns Further, the "RESULT" in FIG. 6 to FIG. 9 are the results, that is, the answer, which must be obtained when the respective shift operations are applied to the input data $D_{in}$ and are also the output data $D_{out}$ which is finally produced. $D_{out}$ is shown in the bottom rows of FIG. 6 to FIG. 9. A, B, C, and D of FIG. 6 to FIG. 9 are bit patterns which appear at the levels of A, B, C, and D of FIG. 4. Further, due to the three (="011") bit shift, SH2 ="0", SH1="1", and SH0="1".

In an arithmetic operation shift (FIGS. 6 and 7), the sign bit, i.e., the MSB, must be maintained until the very end of the operation (the MSB of $D_{in}$ and the MSB of $D_{out}$ should be always equal to each other).

Therefore, as shown in FIG. 5, the MSB (B(n−1)) of the input data $D_{in}$ is selected by the signal SAL (now "0" under the arithmetic operation shift) by the 2-1 selector 12, and becomes the MSB (X(n−1)) of $D_{out}$. Further, due to the nature of the 2's complement, in a right-direction shift, the MSB must be extended as it is (refer to "111" in row "RESULT" of FIG. 6). This can be realized by the logic circuit 16 of FIG. 5, with the MSB supplied as the EXB. Further, due to the nature of the 2's complement, in a left-direction shift, "0" is extended (refer to "000" in the row "RESULT" of FIG. 7).

In a logic operation shift (FIGS. 8 and 9), the empty bits or empty bit after shifting are allotted "0". This is the same in both a right-direction shift and a left-direction shift (refer to "000" in rows "RESULT" of FIGS. 8 and 9).

Figure 10:
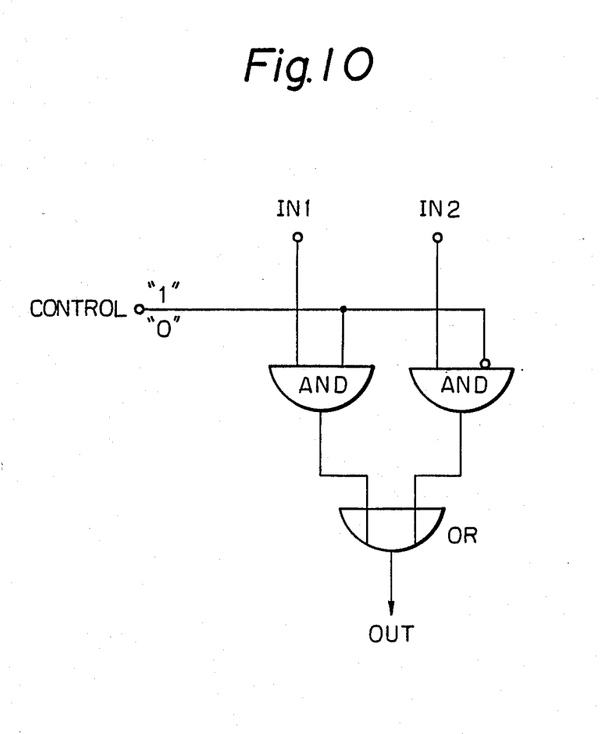
FIG. 10 shows a 2-1 selector comprised of a transfer gate.

As explained above, the barrel shifter of the present invention is comprised in large part of only 2-1 selectors. These 2-1 selectors can be realized simply and at low cost. For example, a 2-1 selector is comprised of just the AND gates and OR gates of FIG. 10 and it is possible to make them with transfer gates. When the control signal is "1", IN1 is selected and output from the two inputs IN1 and IN2, and when "0", IN2 is selected and output.

In this way, in the present invention, the first and second bit reverse units 1 and 3 and the shift stages of the shift unit 2 comprised of 2-1 selectors 4. The 2-1 selector 4 have a simple structure and can operate at a high speed, and therefore, even when the number of bits is increased to improve the operational accuracy, it is possible to realize a barrel shifter for performing shifts of a desired number of bits in one machine cycle by a relatively simple construction, and the control of the same is also simple. Therefore, there is the advantage that even with a large number of bits to be processed, it is easy to use an integrated circuit.

Further, the shift unit 2 is structured for performing shifts in only one direction, to simplify the structure and simplify the control, but through control of the bit reverse units 1 and 3, it is possible to output shift results in any direction. Further, by selection control of the bit reverse units 1 and 3, bit reverse processing can be easily realized.

I claim:

1. A barrel shifter comprising:
   first bit reverse means for reversing the bit position of all bits of input data or passing the bit positions to leave said positions as they are;
   bit shift means, operatively connected to the first bit reverse means and having a plurality of shift stages connected in tandem, for shifting output bits from said first bit reverse means in one fixed direction by exactly the number of bits to be shifted; and
   second bit reverse means, operatively connected to the bit shift means, for reversing the bit position of all bits of input data or passing the bit positions to leave them as they are,
   wherein said first bit reverse means is controlled by a first shift direction control signal which specifies whether a right-or left-direction shift should be carried out,
   said second bit reverse means is controlled by a second shift direction control signal which specifies whether a right- or left-direction shift should be carried out, both said first bit reverse means and said second bit reverse means executing a reverse operation simultaneouly or both two bit reverse means executing the passing operation simultaneously, and whether both two bit reverse means should execute the reverse operation or the passing operation, is decided by determining whether the direction to be shifted is equal to a direction opposite to said one fixed direction or equal to this one fixed direction is determined.

2. A barrel shifter according to claim 1, wherein said first and second bit reverse means and the shift stages of said bit shift means respectively comprises a plurality of 2-1 selectors equal to the number of bits of said input data and said 2-1 selectors each select and output one of two input bits.

3. A barrel shifter according to claim 2, wherein said shift stages of said bit shift means comprise a tandem connection of m stages, where when the number of bits of said input data is n, m is determined according to $\log_2 n$.

4. A barrel shifter according to claim 3, wherein said m number of shift stages of said bit shift means each perform a shift of a number of bits expressed by $2^k$ (k=0, 1, 2 ...).

5. A barrel shifter according to claim 4, wherein
said m number of shift stages comprising said bit shift means are controlled by a shift amount control signal which specifies the amount of the bit shift, each of the control bits which compose said shift amount control signals being applied to a single corresponding bit shift stage.

6. A barrel shifter according to claim 5, wherein each of said m number of shift stages of said bit shift means comprise $2^k$ number of external 2-1 selectors or an external 2-1 selector and the remaining internal 2-1 selectors, the external 2-1 selectors receiving an external bit commonly as one of the two said input bits.

7. A barrel shifter according to claim 6, wherein, when executing a logic operation shift, both said first and second shift direction control signals assume logic "0" for a right-direction shift and logic "1" for a left-direction shift or vice versa and said external bit is logic "0".

8. A barrel shifter according to claim 6, wherein, when executing an arithmetic operation shift, both said first and second shift direction control signals assume logic "0" for a right-direction shift and logic "1" for a left-direction shift or vice versa.

9. A barrel shifter according to claim 8, wherein, when a right-direction shift is to be performed, said external bit is the most significant bit (MSB) of said input data.

10. A barrel shifter according to claim 8, wherein, when a left-direction shift is to be performed, said external bit assumes logic "0".

11. A barrel shifter according to claim 6, wherein said barrel shifter further cooperates with peripheral elements, said peripheral elements comprising:
an input register which stores the input data;
an arithmetic/logic 2-1 selector which receives as first input the most significant bit (MSB) at the input side of the barrel shifter and receives as second input the MSB at the output side and which is controlled by an arithmetic/logic specifying signal indicating whether to perform an arithmetic operation shift or logic operation shift; and
a logic circuit which receives three inputs, i.e., said input side MSB, said first or second shift direction control signal, and said arithmetic/logic specifying signal and which determines said external bit.

12. A barrel shifter according to claim 2, wherein 2-1 selectors are respectively comprised of two-input transfer gates.

13. A barrel shifter comprising:
first bit reverse means for reversing the bit position of all bits of input data or passing the bit positions to leave said bit positions as they are;
bit shift means, operatively connected to the first bit reverse means and having a plurality of shift stages connected in tandem, for shifting output bits from said first bit reverse means in one fixed direction by exactly the number of bits to be shifted; and
second bit reverse means, operatively connected to the bit shift means, for reversing the bit position of all bits of input data or passing the bit positions to leave said bit positions as they are,
wherein said first bit reverse means is controlled by a first shift direction control signal which specifies whether a right- or left-direction shift should be carried out,
said second bit reverse means is controlled by second shift direction control signal which specifies whether a right- or left-direction shift should be carried out, thereby a bit reverse processing is realized by the condition wherein the logic of the said first shift direction control signal and the logic of said second shift direction control signal are made different from each other.

* * * * *

UNITED STATES PATENT AND TRADEMARK OFFICE
CERTIFICATE OF CORRECTION

PATENT NO. : 4,829,460

DATED : May 9, 1989

INVENTOR(S) : Ito

It is certified that error appears in the above-identified patent and that said Letters Patent is hereby corrected as shown below:

| | |
|---|---|
| Col. 2, | line 60, "SL-20" should be --SL20--. |
| Col. 3, | line 39, delete "has". |
| Col. 5, | line 16, after "receives" delete ".". |
| Col. 6, | line 11, "(left direction" should be --(left-direction--; |
| | line 41, "right direction" should be --right-direction--; |
| | line 42, after "shift by" insert --"1".--; |
| | line 43, delete entire line. |
| Col 7, | line 47, after "3-bit" delete "-"; |
| | line 50, after "patterns" insert --.--. |
| Col. 8, | line 57, "right-or" should be --right- or--. |

Signed and Sealed this

Sixteenth Day of January, 1990

Attest:

JEFFREY M. SAMUELS

Attesting Officer     Acting Commissioner of Patents and Trademarks